United States Patent [19]
Nehl

[11] Patent Number: 4,896,925
[45] Date of Patent: Jan. 30, 1990

[54] STORAGE CONTAINER FOR INFORMATION CARRIER

[76] Inventor: Wolfgang Nehl, Martinskirchle 22, 7244 Waldachta 3/Tumlingen, Fed. Rep. of Germany

[21] Appl. No.: 201,116
[22] Filed: May 27, 1988

[30] Foreign Application Priority Data

Jun. 13, 1987 [DE] Fed. Rep. of Germany ....... 3719797

[51] Int. Cl.⁴ .................................................. A47B 88/00
[52] U.S. Cl. ..................................... 312/12; 312/373; 312/319
[58] Field of Search ................. 312/329, 322, 323, 12, 312/13, 311; 206/387

[56] References Cited

U.S. PATENT DOCUMENTS

| | | | |
|---|---|---|---|
| 80,898 | 8/1868 | Becker | 312/323 |
| 369,243 | 8/1887 | Hodges et al. | 312/323 |
| 758,039 | 4/1904 | Andrews | 312/319 X |
| 1,014,831 | 1/1912 | Long | 312/323 X |

FOREIGN PATENT DOCUMENTS

| | | |
|---|---|---|
| 102560 | 12/1983 | European Pat. Off. . |
| 2615457 | 10/1976 | Fed. Rep. of Germany . |
| 2812052 | 10/1978 | Fed. Rep. of Germany . |
| 3216888 | 9/1983 | Fed. Rep. of Germany . |
| 3505956 | 8/1986 | Fed. Rep. of Germany . |
| 8601930 | 3/1986 | PCT Int'l Appl. . |

Primary Examiner—Joseph Falk

[57] ABSTRACT

A storage container for an information carrier, particularly for magnetic tape cassettes comprises a hollow housing, a slider arranged to support an information carrier, the slider being movable in the housing to a withdrawing position in which it partially extends outwardly of the housing, the slider having a main part and a front part which is connected turnably relative to the main part about a pivot axis and is turnable relative to the front part in the withdrawing position, and a guide for guiding the slider, the guide including a guide provided in the housing and a pin provided on the slider at a distance from the pivot axis and engageable in the guide, the guide in the housing being straight in a direction of movement of the slider, the front part being provided in the region of the pivot axis with at least one abutment element which limits the turning of the front part in the withdrawing position.

9 Claims, 2 Drawing Sheets

STORAGE CONTAINER FOR INFORMATION CARRIER

BACKGROUND OF THE INVENTION

The present invention relates to a storage container for an information carrier, particularly for magnetic tape cassettes. More particularly, it relates to such a storage container which has a housing and a slider which is moved in the housing under the action of a spring, to a withdrawing position and has a front part which is turnable in the withdrawing position for allowing withdrawal of an information carrier supported on the slider. The slider has pins which engage in guides provides on both sides of the housing and are arranged at a distance from the pivot axis of the front part.

Storage containers of the above mentioned general type are known in the art. One of such storage containers is disclosed, for example, in the German document DE-OS 32 16 888. This document discloses a storage container which is provided with a pin arranged on a front side of the slider and engageable in a substantially S-shaped groove. The course of the groove determines the turning movement and especially the turning angle. However, an exact and definite end position for the turnable front part of the slider and for the slider cannot be achieved with this solution.

SUMMARY OF THE INVENTION

Accordingly, it is an object of the present invention to provide a storage container for an information carrier, particularly for magnetic tape cassettes, which avoids the disadvantages of the prior art.

More particularly, it is an object of the present invention to provide such a storage container in which a front part of its slider is brought in a withdrawing position to a definite opening position by means of a spring force acting on the slider.

In keeping with these objects and with others which will become apparent hereinafter, one feature of the present invention resides, briefly stated, in a storage container in which a guide for the slider is formed as a straight groove or opening extending in a displacement direction of the slider, and the front part of the slider is provided in the region of a pivot axis with at least one abutment element which limits the turning movement of the front part in the withdrawing position.

The pin which engages in the straight guide limits in connection with the abutment element the longitudinal displacement of the slider and actuates the turning of the front part in the withdrawing position under the action of the spring force acting upon the slider. As a result of this, an operationally secure, stable turning construction is provided, which exactly positions the slider in the withdrawing position. By turning the front part of the slider, a front portion of an information carrier which is located on the slider, for example, a magnetic tape cassette, is released for withdrawal. Therefore, the cassette can be conveniently withdrawn from the housing. It is especially advantageous when the abutment element is formed as a projection which extends in a radial direction relative to the pivot point of the front part of the slider, in direction toward a rear wall of the housing.

It is also especially advantageous when an upper abutment surface and a lower abutment surface of the projection of the front part of the slider form an acute angle with one another.

The abutment surfaces of this projection have such an inclination, that at least the upper abutment surface in the withdrawing position abuts flatly against a respective abutment surface provided in an associated opening of a main part of the slider.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
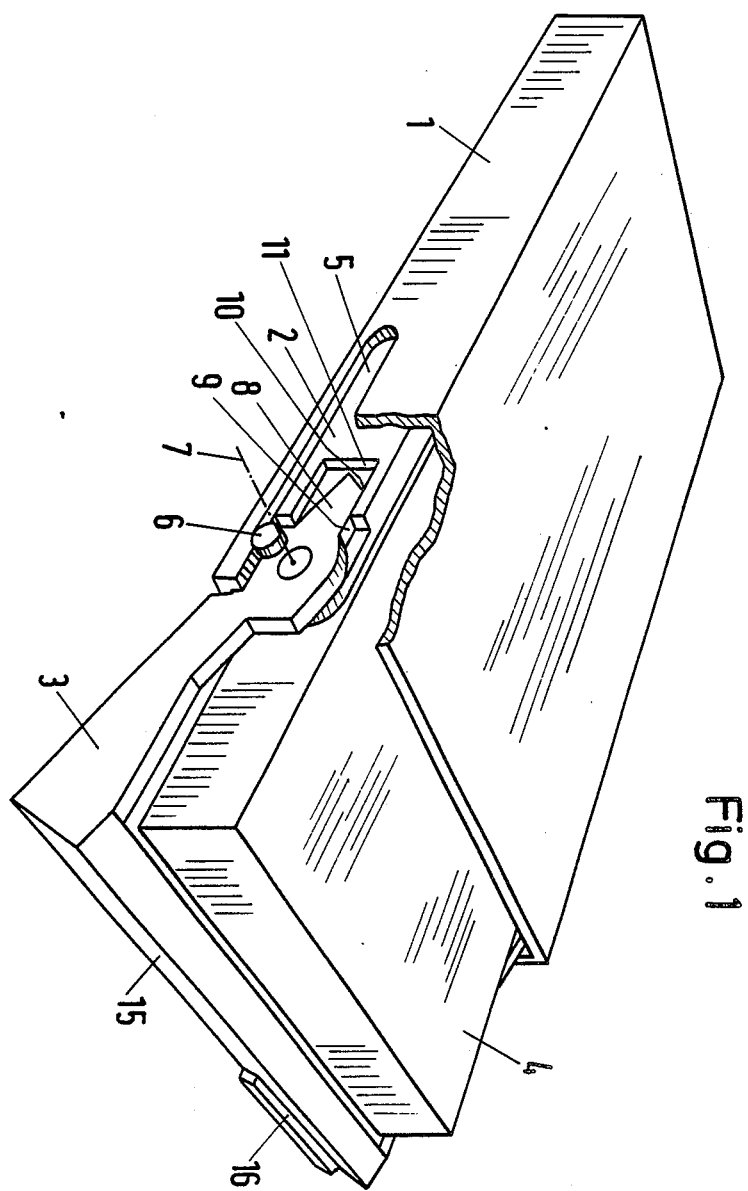
FIG. 1 is a perspective view showing a storage container in with the present invention.

A storage container in accordance with the present invention is shown in FIG. 1. It has a housing 1 and a slider 2 which is slidingly movable in the housing 1 and is provided with a downwardly turnable front part 3. A magnetic tape cassette 4 is located on the slider 2. In the shown withdrawing position it can be engaged by fingers and removed from the housing 1.

The housing 1 is provided with a slot-shaped recess 5 which extends in a longitudinal direction. The recess 5 forms a guide for a pin 6 which is arranged on the front part 3 of the slider 2 at a small distance from a pivot axis 7. An abutment element 8 is further provided on the front part 3. It extends radially from the pivot axis 7 in a rearward direction of the housing 1. The abutment element 8 has an abutment surface 9 which abuts against an associated abutment surface 10 of a recess 11 provided in the slider 2.

Figure 2:
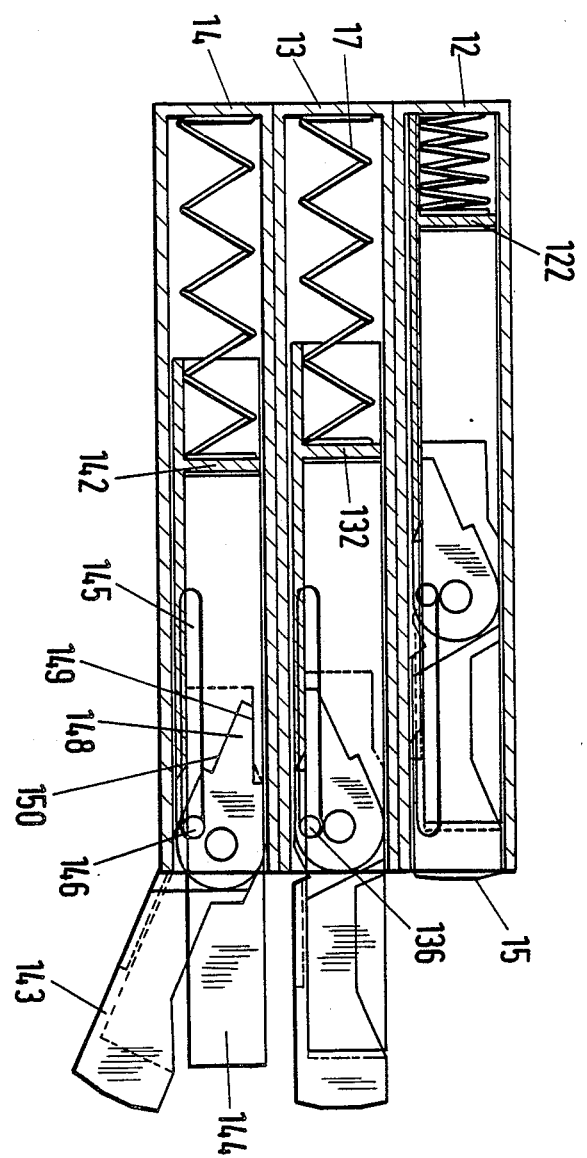
FIG. 2 is a view showing three storage containers of FIG. 1 arranged over one another.

FIG. 2 illustrates the operation of the turnable front part 3 of the slider. In this FIG., three storage containers which are superimposed over one another, are shown in a section. A slider 122 of the upper storage container is located in a closed position. In this position a not shown arresting element engages with the housing. This arresting element can be released by actuation of an acutating element 16 located on a front plate 15 of the front part 3 of the slider 2 and shown in FIG. 1.

After releasing of the arresting element, a spring element 17 which is located in a housing 13 of a central storage container, moves first a slider 132 to the shown position. In this position a pin 136 reaches its end position and comes to abutment. Because of the spring force which acts on the slider 132, the slider 132 further moves in a longitudinal direction until it reaches the position of the slider 142 which in the housing 14 of the lower storage container is the withdrawing position.

Under the action of the spring force which acts on the slider 142, a front part 133 turns to the shown position. In the withdrawing position, an abutment element 148 abuts against an upper abutment, whereby in connection with a pin 146 and a slot-shaped opening 145, an exact positioning of the slider 142 and the front part 143 is achieved. A cassette 144 which lies on the slider 142 can be engaged laterally with fingers and withdrawn from the housing 14 of the lower container.

It will be understood that each of the elements described above, or two or more together, may also find a useful application in other types of constructions differing from the types described above.

While the invention has been illustrated and described as embodied in a storage container for information carrier, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A storage container for an information carrier, particularly for magnetic tape cassettes, comprising a hollow housing; a slider arranged to support an information carrier, said slider being movable in said housing in a direction of movement to a withdrawing position in which it partially extends outwardly of said housing, said slider having a main part and a front part which is connected pivotably relative to said main part about a pivot axis and is pivotal relative to said main part in said withdrawing position; and means for guiding said slider, said guiding means including a guide provided in said housing and a pin provided on said slider at a distance from said pivot axis and engageable in said guide, said guide in said housing being straight in the direction of movement of said slider, said front part being provided in the region of said pivot axis with at least one abutment element which limits the pivoting of said front part in said withdrawing position, said main part of said slider having a side wall and a recess formed in said side wall, said abutment element of said pivotable front part of said slider engaging in said recess of said main part.

2. A storage container as defined in claim 1, wherein said guiding means is provided with a further such guide in said housing and with a further such pin on said slider, said guides being formed in opposite lateral sides of said housing, said pins being formed in opposite lateral sides of said slider.

3. A storage container as defined in claim 1, wherein said guide in said housing is formed as an opening rectilinearly extending in the direction of movement of said slider.

4. A storage container as defined in claim 1, wherein said guide in said housing is formed as a groove rectilinearly extending in the direction of movement of said slider.

5. A storage container as defined in claim 1; and further comprising means for biasing said slider in said housing towards said withdrawing position.

6. A storage container as defined in claim 5, wherein said biasing means includes a spring located in said housing an abutting against said housing and said slider.

7. A storage container as defined in claim 1, wherein said abutment element is formed as a projection extending substantially radially to said pivot axis in a direction which is opposite to a direction of movement of said slider to said withdrawing position.

8. A storage container as defined in claim 7, wherein said housing has a rear wall, said projection which forms said abutment element extends in a direction from said pivot axis toward said rear wall of said housing.

9. A storage container as defined in claim 7, wherein said projection which forms said abutment element has an upper abutment surface and a lower abutment surface which extend toward one another at an acute angle.

* * * * *